United States Patent
Shih et al.

(10) Patent No.: US 12,488,778 B2
(45) Date of Patent: Dec. 2, 2025

(54) NORMALIZING FLOWS WITH NEURAL SPLINES FOR HIGH-QUALITY SPEECH SYNTHESIS

(71) Applicant: NVIDIA Corporation, Santa Clara, CA (US)

(72) Inventors: Kevin Shih, Cambridge, MA (US); José Rafael Valle Gomes da Costa, Berkeley, CA (US); Rohan Badlani, Santa Clara, CA (US); João Felipe Santos, Vancouver (CA); Bryan Catanzaro, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 332 days.

(21) Appl. No.: 18/099,840

(22) Filed: Jan. 20, 2023

(65) Prior Publication Data

US 2024/0038212 A1    Feb. 1, 2024

Related U.S. Application Data

(60) Provisional application No. 63/392,406, filed on Jul. 26, 2022.

(51) Int. Cl.
*G10L 13/027* (2013.01)
*G10L 13/08* (2013.01)
*G10L 25/30* (2013.01)

(52) U.S. Cl.
CPC ............ *G10L 13/027* (2013.01); *G10L 13/08* (2013.01); *G10L 25/30* (2013.01)

(58) Field of Classification Search
CPC ....... G10L 13/027; G10L 13/08; G10L 25/30; G10L 13/047
See application file for complete search history.

(56) References Cited

U.S. PATENT DOCUMENTS

| 11,158,307 B1 | 10/2021 | Ghias et al. |
| 11,605,388 B1 | 3/2023 | Gupta et al. |

(Continued)

FOREIGN PATENT DOCUMENTS

| CN | 111696572 A | 9/2020 | |
| JP | 2015102667 A | 6/2015 | |
| WO | WO-2022063758 A1 * | 3/2022 | ............... G06F 1/03 |

OTHER PUBLICATIONS

Garcia-Romero D., et al., "Speaker Diarization Using Deep Neural Network Embeddings," IEEE International Conference on Acoustics, Speech and Signal Processing (ICASSP), Mar. 5, 2017, pp. 4930-4934.

(Continued)

*Primary Examiner* — Daniel C Washburn
*Assistant Examiner* — Penny L Caudle
(74) *Attorney, Agent, or Firm* — Lowenstein Sandler LLP

(57) ABSTRACT

Disclosed are apparatuses, systems, and techniques that may use machine learning for implementing generative text-to-speech models. The techniques include identifying a mapping of speech characteristics (SC) on a target distribution of a latent variable using a non-linear transformation for at least a subset of the SC. Parameters of the non-linear transformation are determined using a neural network that approximates a statistics of the SC with a statistics predicted for the SC based on the identified mapping and the target distribution of the latent variable.

19 Claims, 10 Drawing Sheets

(56) References Cited

U.S. PATENT DOCUMENTS

| | | | |
|---|---|---|---|
| 11,900,947 | B2 | 2/2024 | Ghaemmaghami et al. |
| 12,100,383 | B1* | 9/2024 | Ezzerg .................. G10L 13/047 |
| 12,233,338 | B1 | 2/2025 | Zhong et al. |
| 2020/0058290 | A1* | 2/2020 | Chae ....................... G10L 15/16 |
| 2020/0302223 | A1 | 9/2020 | Dutta et al. |
| 2020/0394997 | A1 | 12/2020 | Trueba et al. |
| 2020/0402497 | A1 | 12/2020 | Semenov et al. |
| 2021/0142782 | A1 | 5/2021 | Wolf et al. |
| 2021/0224319 | A1* | 7/2021 | Ingel ..................... G06F 16/686 |
| 2021/0304769 | A1 | 9/2021 | Ye et al. |
| 2022/0013106 | A1 | 1/2022 | Deng et al. |
| 2022/0028367 | A1 | 1/2022 | Shekhar et al. |
| 2022/0051654 | A1 | 2/2022 | Finkelstein et al. |
| 2022/0093106 | A1 | 3/2022 | Mosayyebpour Kaskari et al. |
| 2022/0147876 | A1 | 5/2022 | Dalli et al. |
| 2022/0223144 | A1 | 7/2022 | Sun et al. |
| 2022/0319018 | A1 | 10/2022 | Gervais et al. |
| 2023/0011337 | A1 | 1/2023 | Qian et al. |
| 2023/0107450 | A1 | 4/2023 | Chang et al. |
| 2023/0137652 | A1 | 5/2023 | Khoury et al. |
| 2023/0150498 | A1 | 5/2023 | Seong et al. |
| 2023/0206898 | A1 | 6/2023 | Stanton et al. |
| 2023/0410789 | A1 | 12/2023 | Sharma et al. |
| 2023/0410814 | A1 | 12/2023 | Yin et al. |
| 2024/0037316 | A1 | 2/2024 | Mohanty et al. |
| 2024/0046161 | A1 | 2/2024 | Pham et al. |
| 2024/0104055 | A1 | 3/2024 | McAnallen |
| 2024/0105289 | A1 | 3/2024 | Khan et al. |
| 2024/0170007 | A1 | 5/2024 | Qian et al. |

OTHER PUBLICATIONS

Han W., et al., ContextNet: Improving Convolutional Neural Networks for Automatic Speech Recognition with Global Context, arXiv preprint arXiv:2005.03191, May 16, 2020, 5 Pages.

Koluguri N R., et al., "TITANET: Neural Model for Speaker Representation With 1d Depth-wise Separable Convolutions and Global Context," International Conference on Acoustics, Speech and Signal Processing, May 2022, pp. 8102-8106.

Park T J., et al., "Auto-Tuning Spectral Clustering for Speaker Diarization Using Normalized Maximum Eigengap," EEE Signal Processing Letters, 2019, vol. 27, pp. 381-385.

Park T J., et al., "Multi-Scale Speaker Diarization with Neural Affinity Score Fusion," In ICASSP 2021-2021 IEEE International Conference on Acoustics, Speech and Signal Processing (ICASSP), 2021, pp. 7173-7177.

Peng K., et al., "Non-Autoagressive Neural Text-to-Speech," International Conference on Machine Learning, Jun. 29, 2020, pp. 7586-7598.

Ren Y., et al., "FastSpeech: Fast, Robust and Controllable Text to Speech," 33rd Conference on Neural Information Processing Systems (NeurIPS 2019), Nov. 20, 2019, 13 Pages.

Sasirekha D., et al., "Text-to-Speech: A Simple Tutorial," International Journal of Soft Computing and Engineering, Mar. 2012, vol. 2, Issue. 1, pp. 275-278.

Valle R., et al., "Flowtron: an Autoregressive Flow-based Generative Network for Text-to-Speech Sythesis," arXiv preprint arXiv:2005.05957, May 12, 2020, 10 Pages.

Kevin J. Shih, Rafael Valle, Rohan Badlani, Joao Felipe Santos, Bryan Catanzaro: Generative Modeling for Low Dimensional Speech Attributes With Neural Spline Flows; arXiv:2203.01786v2 [cs SD] Mar. 7, 2022; (pp. 22).

Jianfel Chen, Cheng Lu, Biqi Chenli, Jun Zhu, and Tian Tian. VFlow: More expressive generativeflows with variational data augmentation. In Hal Daum'e III and Aarti Singh (eds.), Proceedings of the 37th International Conference on Machine Learning, vol. 119 of Proceedings of MachineLearning Research, pp. 1660-1669. PMLR, Jul. 13-18, 2020. URL https://proceedings.mir.press/v119/chen20p.html.

Vincent Dumoulin, Jonathon Shiens, and Manjunath Kudlur. A learned representation for artistic style, ICLR, 2017. URL https://arxiv.org/abs/1610.07629.

Emilien Dupont, Amaud Doucet, and Yee Whye Teh. Augmented neural odes. Advances in Neural Information Processing Systems, 32:3140-3150, 2019.

Conor Durkan, Artur Bekasov, Iain Murray, and George Papamakarios. Neural spline flows. Advances in Neural Information Processing Systems, 32:7511-7522, 2019.

Chin-Wei Huang, Laurent Dinh, and Aaron Courville. Augmented normalizing flows: Bridging the gap between generative flows and latent variable models. arXiv preprint arXiv:2002.07101, 2020.

Myeonghun Jeong, Hyeongju Kim, Sung Jun Cheon, Byoung Jin Choi, and Nam Soo Kim. Diff-tts: A denoising diffusion model for text-to-speech. arXiv preprint arXiv:2104.01409, 2021.

Hideki Kawahara, Alain de Cheveign'e, Hideki Banno, Toru Takahashi, and Toshio Irino. Nearly defect-free f0 trajectory extraction for expressive speech modifications based on straight. In Ninth European Conference on Speech Communication and Technology, 2005.

Hyeongju Kim, Hyeonseung Lee, Woo Hyun Kang, Joun Yeop Lee, and Nam Soo Kim. Softflow: Probabilistic framework for normalizing flow on manifolds. Advances in Neural Information Processing Systems, 33, 2020a.

Jaehyeon Kim, Sungwon Kim, Jungil Kong, and Sungroh Yoon. Glow-tts: A generative flow for text-to-speech via monotonic alignment search. Advances in Neural Information Processing Systems, 33, 2020b.

Durk P Kingma and Prafulla Dhariwal. Glow: Generative flow with invertible 1×1 convolutions. In S. Bengio, H. Wallach, H. Larochelle, K. Grauman, N. Cesa-Bianchi, and R. Garnett (eds.), Advances in Neural Information Processing Systems, vol. 31. Curran Associates, Inc., 2018.

Durk P Kingma, Tim Salimans, Rafal Jozefowicz, XI Chen, Ilya Sutskever, and Max Welling. Improved variational inference with inverse autoregressive flow. Advances in neural information processing systems, 29:4743-4751, 2016.

Jungil Kong, Jaehyeon Kim, and Jaekyoung Bae. Hifi-gan: Generative adversarial networks for efficient and high fidelity speech synthesis. Advances in Neural Information Processing Systems, 33, 2020.

Adrian Lancucki. Fastpitch: Parallel text-to-speech with pitch prediction. In ICASSP 2021-2021 IEEE International Conference on Acoustics, Speech and Signal Processing (ICASSP), pp. 6588-6592. IEEE, 2021.

Matthias Mauch and Simon Dixon. pyin: A fundamental frequency estimator using probabilistic threshold distributions. In 2014 IEEE international conference on acoustics, speech and signal processing (icassp), pp. 659-663. IEEE, 2014.

A.V. McCree and T.P. Barnwell. A mixed excitation lpc vocoder model for low bit rate speech coding. IEEE Transactions on Speech and Audio Processing, 3(4):242-250, 1995. doi: 10.1109/89.397089.

C. Miao, S. Liang, M. Chen, J. Ma, S. Wang, and J. Xiao. Flow-tts: A non-autoregressive network for text to speech based on flow. In IEEE International Conference on Acoustics, Speech and Signal Processing (ICASSP), 2020.

Robert A Moog. Midi: musical instrument digital interface. Journal of the Audio Engineering Society, 34(5):394-404, 1986.

Thomas Müller, Brian McWilliams, Fabrice Rousselle, Markus Gross, and Jan Novak. Neural importance sampling. ACM Transactions on Graphics (TOG), 38(5):1-19, 2019.

Tomohiro Nakatani, Shigeaki Amano, Toshio Irino, Kentaro Ishizuka, and Tadahisa Kondo. A method for fundamental frequency estimation and voicing decision: Application to infant utterances recorded in real acoustical environments. Speech Communication, 50(3):203-214, Mar. 2008. ISSN 0167-6393. doi: 10.1016/j.specom.2007.09.003. URL http://dx.doi.org/10.1016/j.specom.2007.09.003.

Wel Ping, Kainan Peng, Kexin Zhao, and Zhao Song. Waveflow: A compact flow-based model for raw audio. In International Conference on Machine Learning, pp. 7706-7716. PMLR, 2020.

Vadim Popov, Ivan Vovk, Vladimir Gogoryan, Tasnima Sadekova, and Mikhail Kudinov. Grad-tts: A diffusion probabilistic model for text-to-speech. arXiv preprint arXiv:2105.06337, 2021.

(56) References Cited

OTHER PUBLICATIONS

M Ren, Chenxu Hu, Xu Tan, Tao Qin, Sheng Zhao, Zhou Zhao, and Tie-Yan Liu. Fastspeech 2: Fast and high-quality end-to-end text to speech. arXiv preprint arXiv:2006.04558, 2020.

Kevin J Shih, Rafael Valle, Rohan Badlani, Adrian Lancucki, Wei Ping, and Bryan Catanzaro. Rad-tts: Parallel flow-based tts with robust alignment learning and diverse synthesis. In ICML Workshop on Invertible Neural Networks, Normalizing Flows, and Explicit Likelihood Models, 2021.

Antti Suni, Daniel Aalto, Tuomo Raitio, Paavo Alku, and Martti Vainio. Wavelets for intonation modeling in hmm speech synthesis. Jan. 2013.

Rafael Valle, Jason Li, Ryan Prenger, and Bryan Catanzaro. Mellotron: Multispeaker expressive voice synthesis by conditioning on rhythm, pitch and global style tokens. In ICASSP 2020-2020 IEEE International Conference on Acoustics, Speech and Signal Processing (ICASSP), pp. 6189-6193. IEEE, 2020a.

Rafael Valle, Kevin J Shih, Ryan Prenger, and Bryan Catanzaro. Flowtron: an autoregressive flow-based generative network for text-to-speech synthesis. In International Conference on Learning Representations, 2020b.

Doty C., et al., "What Is Speaker Diarization," Deepgram, Aug. 2022, 9 Pages Retrieved from internet URL: https://deepgram.com/learn/what-is-speaker-diarization.

Ito, K., et al., "The LJ Speech Dataset," BibSonomy, 2017. Retrieved from the Internet: [https://keithito.com/LJ-Speech-Dataset/].

Kim, J., et al., "Glow-TTS: A Generative Flow for Text-to-speech via Monotonic Alignment Search," Advances in Neural Information Processing Systems, 2020b, 11 Pages.

Kong, J., et al., "Hifi-gan: Generative Adversarial Networks for Efficient and High Fidelity Speech Synthesis, "2022, Retrieved from the Internet: [https://github.com/jik876/hifi-gan,].

Ren, Y., et al., "FastSpeech 2: Fast and High-Quality End-to-End Text to Speech," Aug. 8, 2022, 15 Pages. Retrived from the Internet: [https://speechresearch.github.io/fastspeech2/].

Wang, Q., et al., "Speaker Diarization With LSTM," ArXiv, Jan. 2022, 5 Pages Retrieved from internet URL: https://arxiv.org/pdf/1710.10468.

Zhang Y., et al., "Audio segmentation based on multi-scale audio classification." IEEE, Aug. 2004, vol. 4, pp. 349-352 Retrieved from Internet URL: https://ieeexplore.ieee.org/stamp/stamp.jsp?tp=arnumber=1326835tag=1.

\* cited by examiner

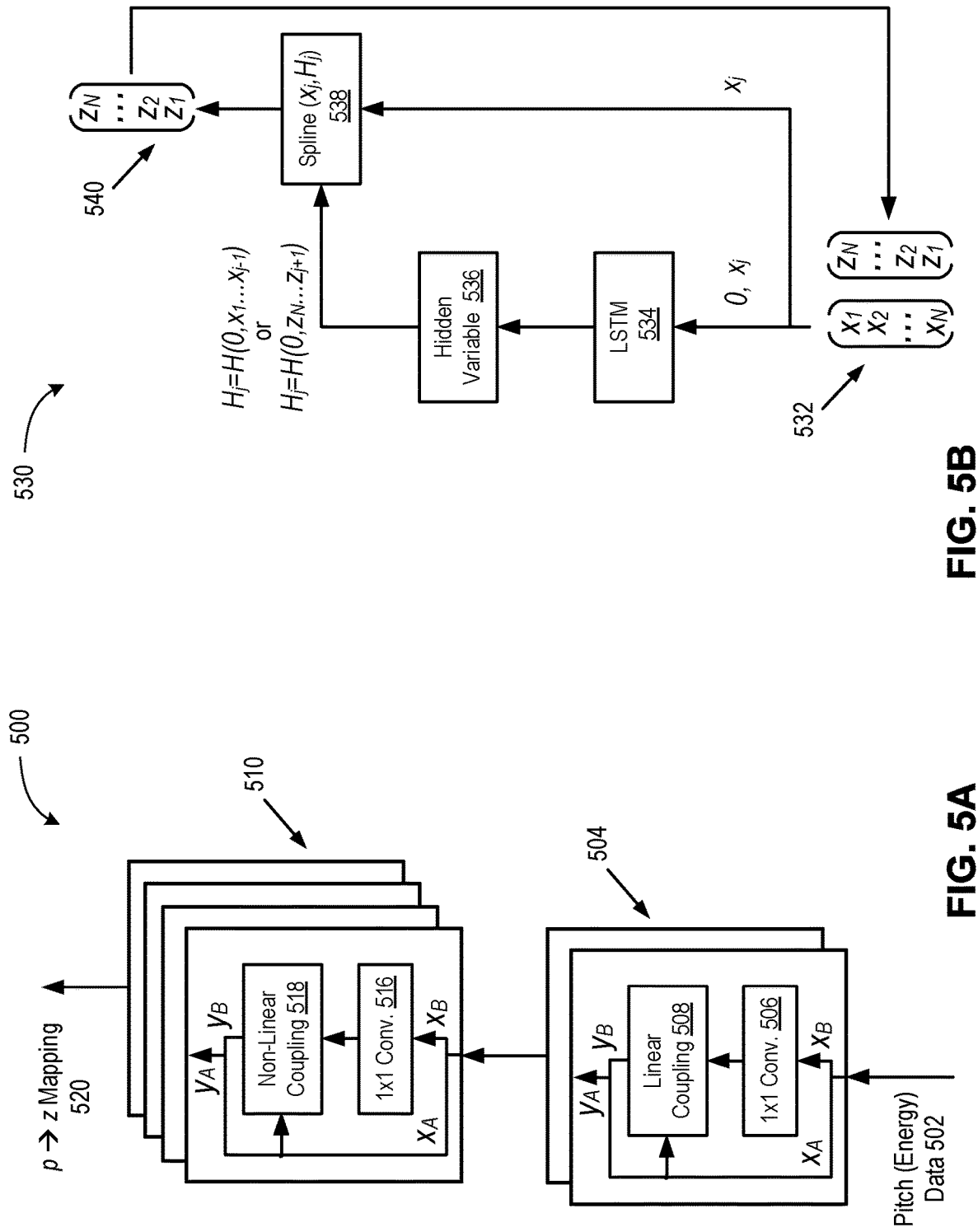

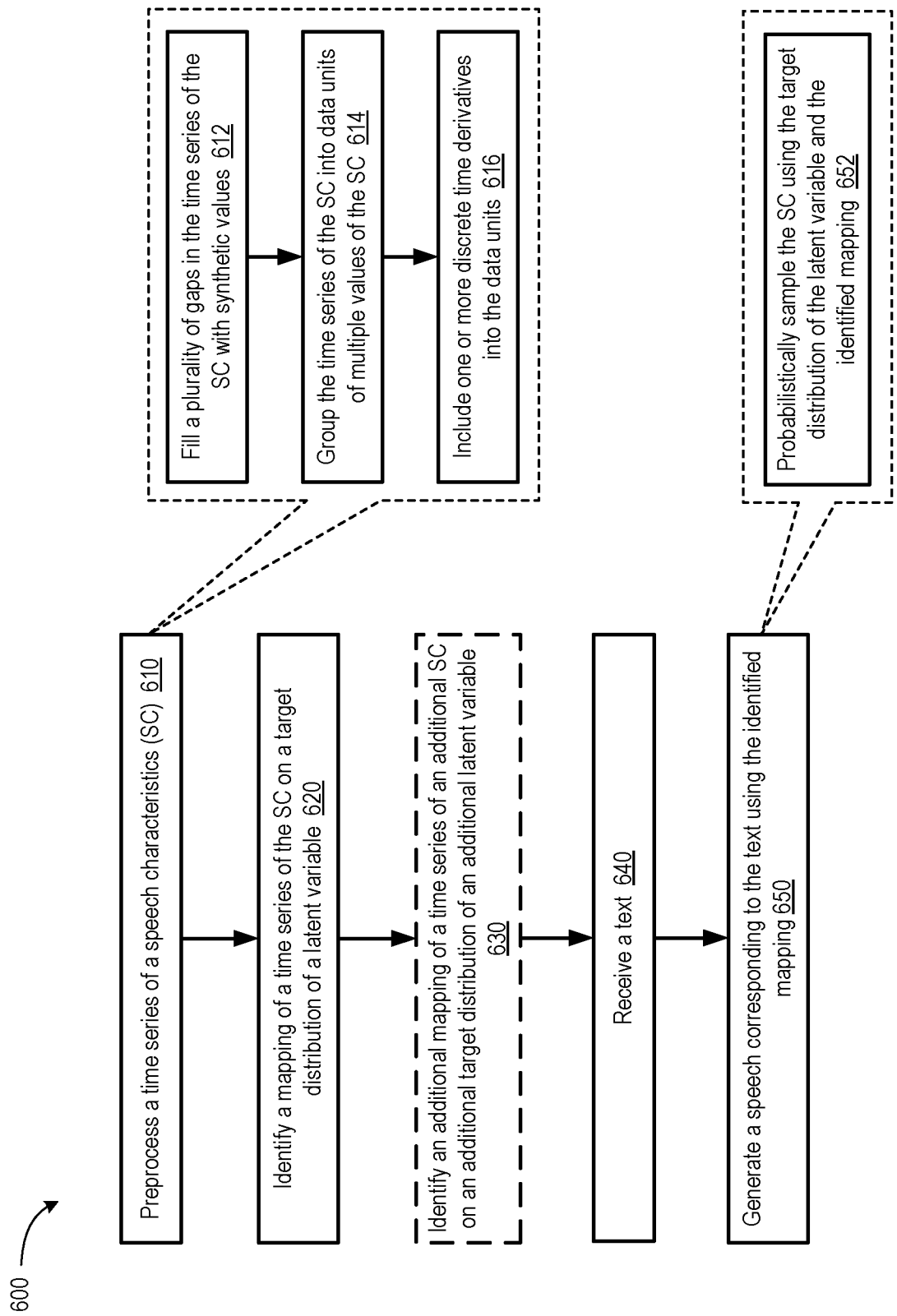

NORMALIZING FLOWS WITH NEURAL SPLINES FOR HIGH-QUALITY SPEECH SYNTHESIS

RELATED APPLICATIONS

This application claims the benefit of priority from U.S. Provisional Application No. 63/392,406 filed on Jul. 26, 2022, which is incorporated herein by reference.

TECHNICAL FIELD

At least one embodiment pertains to processing resources used to perform and facilitate text-to-speech (TTS) synthesis. For example, at least one embodiment pertains to neural networks that enable accurate modeling of speech attributes to facilitate speech synthesis of high quality.

BACKGROUND

Speech synthesis typically involves analyzing existing speech samples and correlating various phonemes (units of speech), pauses, etc., in the samples of the person's spoken speech with respective texts of that speech. The text-phoneme associations gleaned from such analysis can then be applied to new texts to generate a sound (voice) representation of the new texts. While simple mechanistic TTS synthesis was first successfully developed decades ago, high-quality TTS synthesis remains a challenging problem. In particular, various speech attributes, e.g., intonation, volume, etc., vary from occurrence to occurrence, from text to text, with various contextual attributes (e.g., emotions, type and content of the text, etc.) affecting the specifics of that person's speech. Moreover, even within the same episode of speech, the same person can pronounce the same words slightly differently, depending on the changes in breathing, and the like. Deterministic synthetic speech that fails to simulate such natural variations sounds robotic to a human ear, lacks expressiveness, and may fail to capture the attention of a listener.

BRIEF DESCRIPTION OF DRAWINGS

FIG. 5A illustrates an example architecture of a bipartite normalizing flow model that implements non-linear neural splines, according to at least one embodiment;

FIG. 5B illustrates an example architecture of an autoregressive normalizing flow model with non-linear neural splines, according to at least one embodiment;

FIG. 6 is a flow diagram of method of training generative text-to-speech models with normalizing flows and non-linear splines for high-quality synthesis, according to some embodiments of the present disclosure;

DETAILED DESCRIPTION

Figure 1:
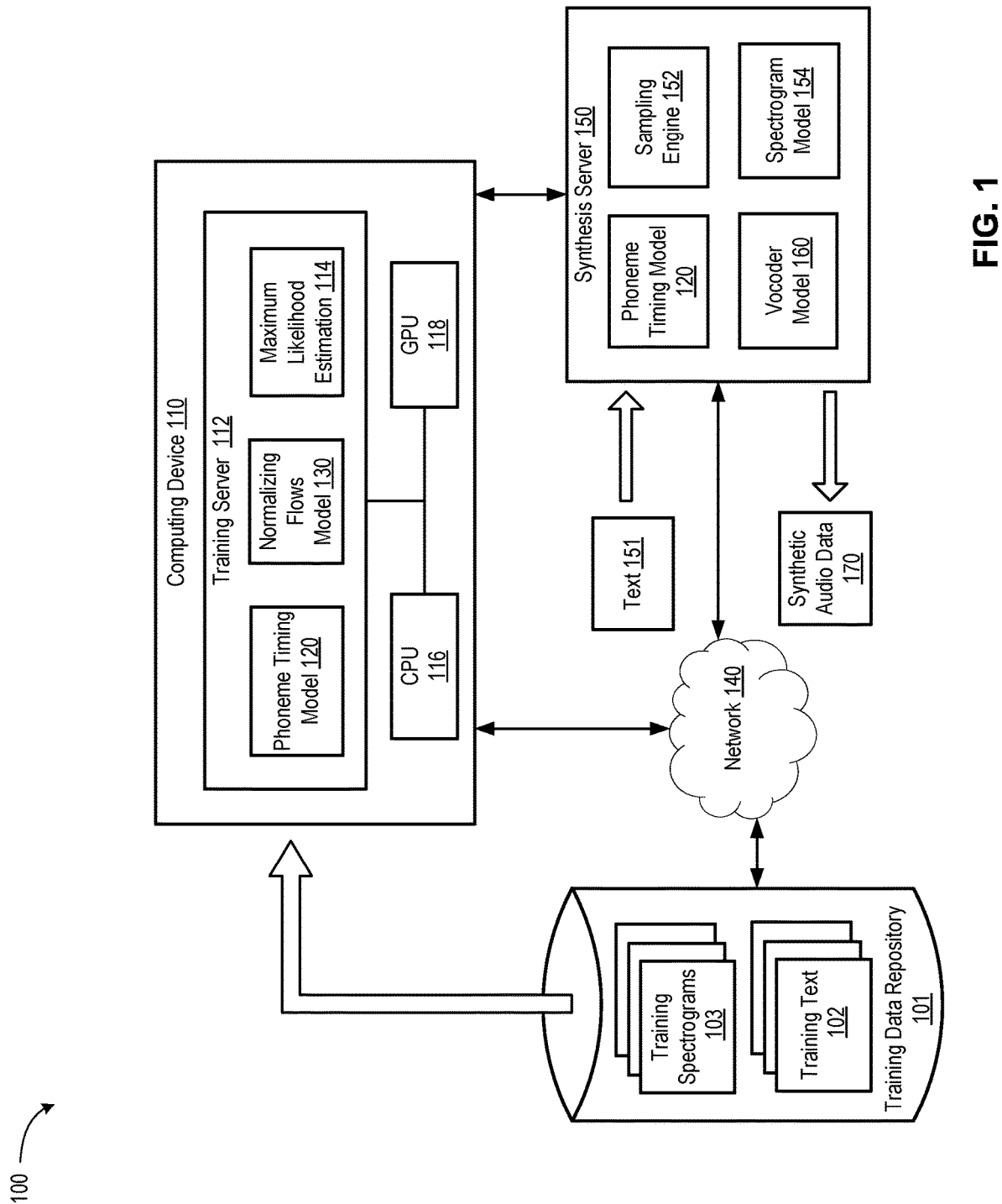
FIG. 1 is a block diagram of an example computer system that uses neural networks to implement generative text-to-speech modeling with normalizing flows and non-linear splines for high-quality speech synthesis, in accordance with at least some embodiments.

Autoregressive TTS modeling is an improvement on deterministic speech synthesis. Autoregressive TTS modeling conditions subsequent sounds on multiple previously generated sounds and thus takes into account at least some context of the speech. Generative TTS models treat a text as a conditional variable and aim to determine posterior probability distributions for pronunciation of various phonemes based on specific values of those conditional variables. Generative models allow sampling from the determined probability distributions during generation of new speech. As a result, the generated speech acquires a more natural diversity. Generative models allow a speech developer to control the amount of diversity in the synthesized speech, e.g., by limiting or expanding the region in the distributions from which the sampling takes place. Distributions of phonemes can be rather complicated. Generative models can use a series of mathematical transformations that aim to express these complicated distributions in terms of various latent variables that are mapped on the actual speech variables but have a much simpler model form (e.g., of a Gaussian distribution). The mappings of the distributions can be performed using neural networks, which can be trained on the existing speech samples. Although autoregressive (deterministic) models sometimes account for low-level speech attributes of the synthetic speech, such as pitch (fundamental frequency) and energy (volume), existing generative models do not use such data. On the other hand, pitch and energy are relatively robust to noise and other distortions and failing to use pitch and/or energy during the mapping stage misses an opportunity to significantly improve the quality of the TTS process.

Aspects and embodiments of the present disclosure address these and other technological challenges by disclosing techniques and systems that enable efficient leveraging of low-level speech attributes, such as pitch and energy, during construction of generative speech models. The disclosed techniques analyze existing speech samples using neural networks that use spline approximations to enable highly expressive mappings of low-level speech attributes to latent variables that have a target statistics. The speech models constructed using the disclosed techniques are capable of generating synthetic speech of high quality. Using pitch (and, similarly, energy) data to improve synthetic speech in generative models is challenging since pitch data (unlike audio waveform) is usually discontinuous. For example, pitch data typically has periods during which the person delivering speech produces acoustic output that is aperiodic ("unvoiced regions") and lacks a fundamental frequency (or periods where a speaker simply remains silent). Using unvoiced regions together with voiced regions for modeling of the speaker's pitch increases pitch variance well beyond the actual variance of the pitch. A generative model that lacks awareness of the unvoiced region could attempt to map all data (from both voiced and unvoiced region) leading to catastrophic audio artifacts in the synthesized speech, such as unexpected spikes and dips in the middle of a spoken phrase.

In some embodiments, each unvoiced region may be filled with values that depend on the distance to adjacent voiced regions (e.g., the last voiced region and/or the next voiced region) and on the values of the pitch in those adjacent voiced regions. For example, the unvoiced regions may be filled out using U-shaped curves. Since unvoiced regions often depend on the intended text, in some embodiments unvoiced regions may be represented with negative bias terms that can be learned in correlation with the underlying spoken phoneme sequences. The negative bias terms and/or U-shaped curves fill the unvoiced regions while avoiding overlap with valid data. Such negative bias terms, U-shaped curves, and/or other similar techniques of filling unvoiced regions with non-constant (and negative) are advantageous in comparison with constant value padding.

Additional challenge in fitting pitch (or energy) data is that such data is intrinsically one-dimensional. Neural networks (in particular, convolutional neural networks) tend to increase the dimensionality of data (e.g., vial application of suitable kernels) since multi-dimensionality of data provides additional degrees of freedom to fit complex functions. The mapping of the actual variables to the latent variables in normalizing flow models is typically bijective (meaning a one-to-one correspondence) while various standard kernel-based techniques that increase dimensionality tend to break bijectivity. To address such challenges, the disclosed embodiments deploy grouping data points into multi-dimensional data units and other techniques that increase dimensionality of the data. More specifically, a set of data points $\{p_j\}=p_1, p_2 \ldots$ may be grouped into groups of two (three, etc.) multi-dimensional units of data, $(p_1, p_2)$, $(p_3, p_4)$. In some embodiments, units for pitch data (e.g., two points) may have different sizes than groups for energy data (e.g., four points). Additional increase in dimensionality may be achieved by adding derivatives to the units of the data points, e.g., $(p_1, \partial p_1/\partial t, p_2, \partial p_2/\partial t)$, $(p_3, \partial p_3/\partial t, p_4, \partial p_4/\partial t)$ . . . . In addition to increasing the dimensionality, the inclusion of derivatives leads to better contextual connections between adjacent groups.

In some embodiments, mapping between the actual variables (pitch, energy) and the corresponding latent variables may be performed using normalizing flows techniques, where each measured variable is iteratively expressed (with accuracy increasing with each iteration) via the target variable ("flows" toward the target variable). The target variable may have a simple distribution, e.g., a normal (Gaussian) distribution, a uniform distribution, a Laplace distribution, a beta distribution, some other similar distribution, or any combination thereof. More specifically, units of pitch variables p (e.g., the multi-dimensional groups described above) may be mapped to a target distribution $f_z$ of a latent variable z that is hypothesized to represent the pitch data. The mapping $p=G_\theta(z)$ may be some bijective invertible function ($z=G_\theta^{-1}(p)$) parameterized by one or more fitting parameters $\theta$ that are selected in such a way as to maximize the likelihood that the target distribution $f_z$ together with the mapping $p=G_\theta(z)$ produces the distribution $f_p$ that corresponds to the actual data collected for the variable p. The parameters $\theta$ of the mapping $p=G_\theta(z)$ may be determined using a neural network as part of the neural network training. In some embodiments, the output of the neural network may be further conditioned on an object (e.g., a matrix) $\Phi_{text}$ that specifies alignment (e.g., a temporal cadence of spoken phonemes) between the spoken speech and its textual representation. In some embodiments, the mapping $p=G_\theta(z)$ may be determined as a composite function consisting of multiple functions ("coupling layers"), each function taking the actual distribution $f_p$ closer to the target distribution $f_z$. Such functions may be taken as linear functions to ensure their invertibility. It is the import of the present disclosure that non-linear functions (e.g., quadratic polynomials, cubic polynomials, etc.) may be even more effective for mapping of the actual variables on the latent variables. In particular, such non-linear functions (splines) may be applied by splitting the range of the variables (e.g., the actual measured data or the latent target variable, or any intermediate coupling layer variables) into a number of bins, with a separate polynomial or other fitting function assigned to each bin. A separate neural network (or subnetwork) may implement a respective coupling layer by determining the parameters of the splines for various bins. Such normalizing flows with non-linear splines may be applied (e.g., in parallel) to ascertain statistical properties of multiple variables, including but not limited to pitch and energy.

Numerous other embodiments are described herein. The advantages of the disclosed techniques include but are not limited to efficient incorporation, during the TTS generative modeling, of various valuable quantities (in particular, pitch and energy) that have not been traditionally used despite their robustness against noise and other recording defects. This, generally, improves the overall quality of speech synthesis and, more specifically, results in realistic distributions of speech properties that enable sampling of more natural synthetic speech than other currently available methods and techniques.

System Architecture

FIG. 1 is a block diagram of an example computer system 100 that uses neural networks to implement generative text-to-speech modeling with normalizing flows and non-linear splines for high-quality speech synthesis, in accordance with at least some embodiments. As depicted in FIG. 1, a computing system 100 may include a training data repository 101 and a computing device 110 hosting a training server 112. Training data repository 101 and computing device 110 may be connected to a network 140. Network 140 may be a public network (e.g., the Internet), a private network (e.g., a local area network (LAN), or wide area network (WAN)), a wireless network, a personal area network (PAN), or a combination thereof. Computing system 100 may be configured to process any text 151 to generate synthetic audio data 170 that includes a suitable audio representation of text 151, e.g., a spoken version of text 151 synthesized based on prior speech samples available for the same speaker and stored in data repository 101. Prior speech samples may include training text(s) 102 and spectrogram(s) 103 or any other suitable representation characterizing speech of a particular person when a respective text(s) is being spoken. For example, a spectrogram 103 may be obtained by recording air pressure caused by the speech as a function of time and computing a short-time Fourier transform for overlapping time intervals (frames) of a set duration. This maps the audio signal from the time domain to the frequency domain and provides a spectrogram 103 characterizing the spectral content of the speech. The amplitude of the audio signal may be represented on a logarithmic (decibel) scale. In some embodiments, the obtained spectrograms may be further converted into mel-spectrograms, by transforming frequency f into a non-linear mel domain, f→m=a ln(1+f/b), to take into account the ability of a human ear to distinguish better equally spaced frequencies (tones) at the lower end of the frequencies of the audible spectrum than at its higher end; for example, a=1127 and b=700 Hz. Throughout this disclosure, the term spectrogram should also be understood to include mel-spectrograms.

Training text(s) 102 and spectrogram(s) 103 may be used by a training server 112 to identify features of speech that may subsequently be used by synthesis server 150 to synthesize new speech for text 151 previously not seen by computing system 100. Training server 112 may be hosted by computing device 110. Computing device 110 may be a desktop computer, a laptop computer, a smartphone, a tablet computer, a server, or any suitable computing device capable of performing the techniques described herein. Training server 112 may train a number of machine learning models, which in some embodiments may be neural network models. Training server 112 may train a phoneme timing model 120 to identify a timing sequence of spoken phonemes. In some embodiments, training of phoneme timing model 120 may be supervised. More specifically, phoneme timing model 120 may use training text(s) 102 as an input and training spectrograms 103 as a ground truth to identify spoken cadence and duration of various phonemes and phoneme sequences in spoken text(s) 102.

Training server 112 may further train a normalizing flows model 130. In some embodiments, training of normalizing flows model 130 may be unsupervised. Normalizing flows model 130 may use training spectrograms 103 as inputs and may output statistics of various speech characteristics contained in spectrograms 103. More specifically, fundamental frequency (pitch) p(t) and energy (volume) data e(t) may be determined for each frame t of spectrograms 103. Normalizing flows model 130 may analyze the statistics of pitch p(t) (and, similarly, energy e(t)) and map that statistics on a target statistics (e.g., the normal distribution) of appropriately learned, during training, latent variables. Normalizing flows model 130 may operate by using a maximized likelihood estimation (MLE) function 114 and thus ensuring that the likelihood of the target statistics of the latent variables correctly describing the training pitch (and energy) data is maximized.

The trained normalizing flows model 130 identifies correct mappings of pitch/energy data to latent variables. The mappings represent an individualized fingerprint of each speaker's speech/voice. The mappings may be provided to synthesis server 150 together with phoneme timing model 120. A new text 151 provided to synthesis server 150 may be processed by phoneme timing model 120 to identify timing cadence (prosody) for various phonemes of the synthetic speech determined from text 151. A sampling engine 152 may use the phoneme cadence together with a random sampling within the target distribution of the latent variables, appropriately mapped to the actual distributions of the respective speech attributes (e.g., pitch, energy, etc.). The sampled distributions may be used by a spectrogram model 154 to generate spectrograms associated with the sampled speech attributes. A vocoder model 160 may then transform the generated spectrograms to synthetic audio data 170, which may include actual audio waveforms of the generated speech corresponding to text 151. Spectrogram model 154 and vocoder model 160 may be any suitable models trained to generate speech based on input phoneme sequence, sampled features, and cadence of the speech. In some embodiments, spectrogram model 154 and/or vocoder model 160 may be trained by training server 112. Spectrogram model 154 and/or vocoder model 160 may be trained together with or separately from phoneme timing model 120 and/or normalizing flows model 130. In some embodiments, spectrogram model 154 and/or vocoder model 160 may be trained using some other computing service or machine.

In some embodiments, training data repository 101 may be a persistent storage capable of storing textual files, audio files, audio spectrogram data, as well as various metadata for the stored data. Training data repository 101 may be hosted by one or more storage devices, such as main memory, magnetic or optical storage disks, tapes, or hard drives, network-attached storage (NAS), storage area network (SAN), and so forth. Although depicted as separate from computing device 110, in at least one embodiment, training data repository 101 may be a part of computing device 110. In at least some embodiments, training data repository 101 may be a network-attached file server, while in other embodiments training data repository 101 may be some other type of persistent storage, such as an object-oriented database, a relational database, and so forth, that may be hosted by a server machine or one or more other machines coupled to the computing device 110 via network 140.

Computing device 110 may include a memory (not shown in FIG. 1) communicatively coupled with one or more processing devices, such as one or more central processing units (CPU) 116 and one or more graphics processing units (GPU) 118 and. The memory of computing device 110 may store executable codes, libraries, and various dependencies of training server 112 and one or more models that are being trained thereon, e.g., phoneme timing model 120, normalizing flows model 130, spectrogram model 154, vocoder model 160, and the like. Training server 112 may be executed by CPU 116, GPU 118, or both. In at least one embodiment, GPU 118 may include multiple cores, each core being capable of executing multiple GPU threads. Each core may run multiple threads concurrently (e.g., in parallel). In at least one embodiment, threads may have access to registers. Each core may include a scheduler to distribute computational tasks and processes among different threads of the respective core. A dispatch unit may implement scheduled tasks on appropriate threads using various private registers and shared registers. In at least one embodiment, GPU 118 may have a (high-speed) cache, access to which may be shared by multiple cores. Furthermore, computing device 110 may include a GPU memory in which GPU 118 may store intermediate and/or final results (outputs) of various computations performed by GPU 118. Training server 112 may determine which processes are to be executed on GPU 118 and which processes are to be executed on CPU 116.

In at least one embodiment, synthesis server 150 may be a part of computing device 110. In other embodiments, synthesis server 150 may be communicatively coupled to computing device 110 directly or via network 140. Training server 112 and/or synthesis server 150 may be (and/or include) a rackmount server, a router computer, a personal computer, a laptop computer, a tablet computer, a desktop computer, a media center, or any combination thereof.

Text-to-Speech Models with Non-Linear Splines

Figure 2:
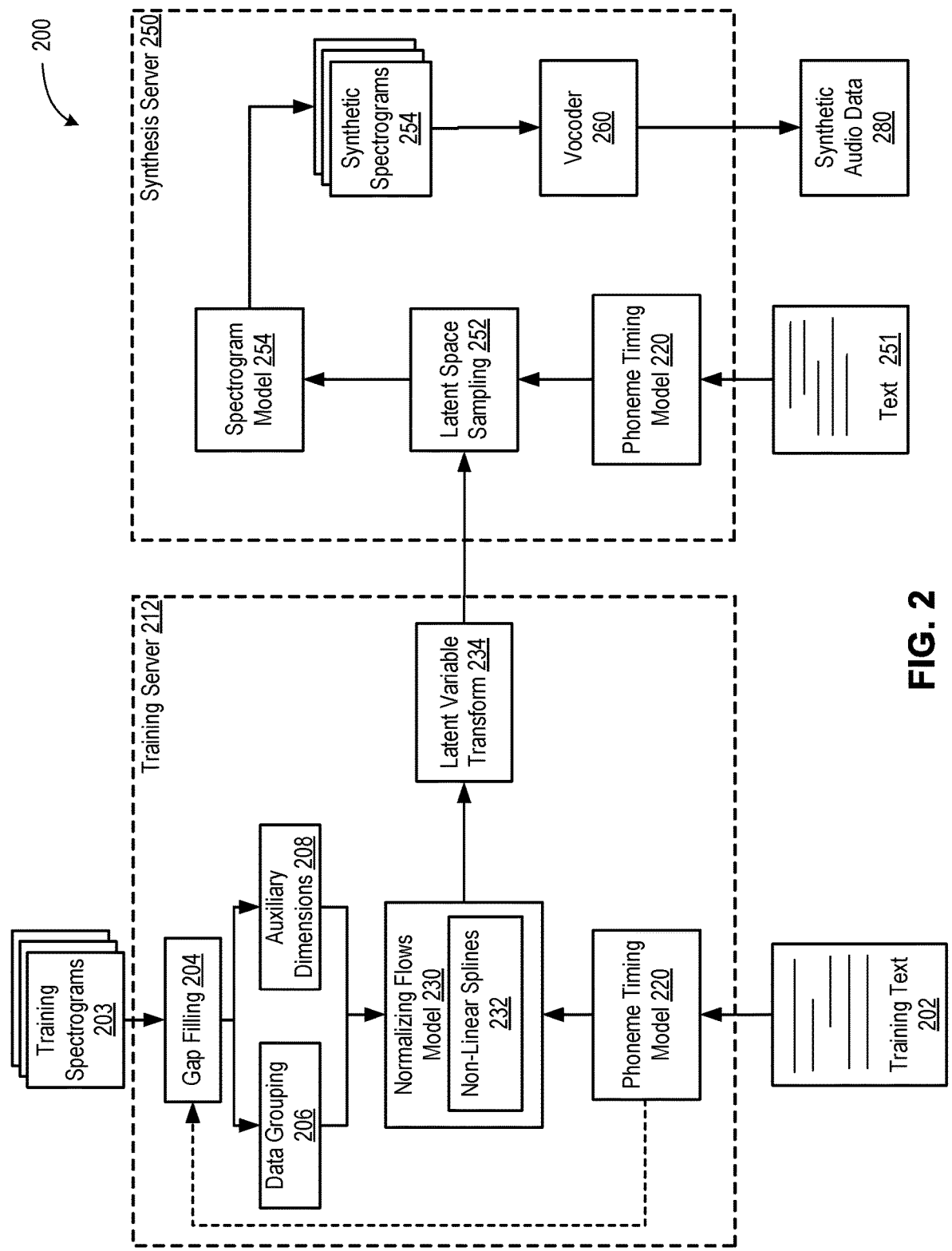
FIG. 2 illustrates an example data flow during training of neural networks and subsequent use of the trained neural networks to implement generative text-to-speech models with normalizing flows and non-linear splines for high-quality speech synthesis, according to at least one embodiment.

FIG. 2 illustrates an example data flow 200 during training of neural networks and subsequent use of the trained neural networks to implement generative text-to-speech models with normalizing flows and non-linear splines for high-quality speech synthesis, according to at least one embodiment. In at least one embodiment, data flow 200 may be implemented by training server 112 and synthesis server 150, which may be located on a single computing device (e.g., on computing device 110 of FIG. 1) or on different computing devices. Various blocks in FIG. 2 having the same two last digits in the numerical designation as respective blocks of FIG. 1 may implement the same (or a similar functionality).

As illustrated in FIG. 2, training text 102 and training spectrograms 103 may be used as an input into training server 112. Training spectrograms 103 may characterize a spoken, by a particular person, training text 102. Although a single training text 102 is illustrated in FIG. 1 for brevity and conciseness, multiple instances of training texts and associated spectrograms may be used to train the TTS model that implements data flow 200.

Figure 3A:
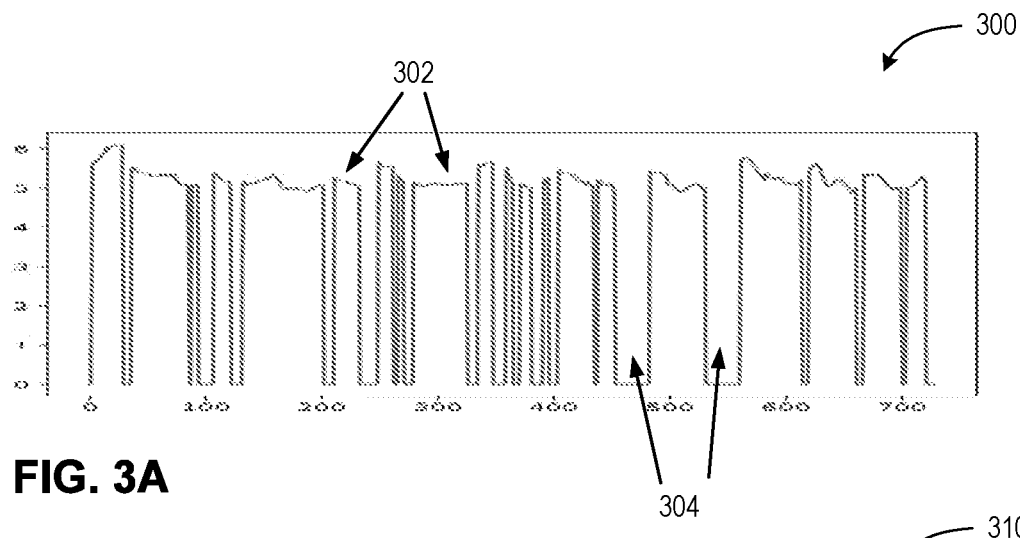
FIG. 3A illustrates a typical pitch data of a natural speech produced by an ordinary speaker.
Figure 3B:
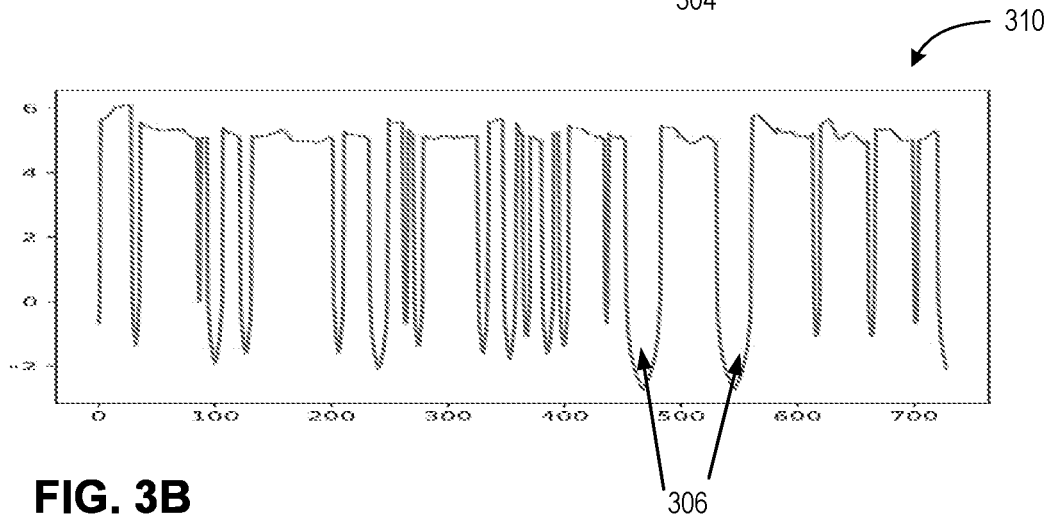
FIG. 3B depicts one illustrative non-limiting example of a local gap filling of unvoiced regions using a U-shaped function, according to at least one embodiment.

In some embodiments, training spectrograms 103 may be derived from speech that has been preprocessed. Preprocessing may include filtering, denoising, amplification, equalization, correcting for microphone distortion, and the like. Although the description below focuses on pitch data p(t) derived from training spectrograms 103, similar techniques may be used to process energy data e(t) derived from the same (or different) spectrograms. For example, two different sets of neural network models may be trained separately (e.g., in parallel), for pitch data and for energy data, respectively. FIG. 3A illustrates a typical pitch data 300 of a natural speech produced by an ordinary speaker. Pitch data includes voiced regions 302 with well-defined fundamental frequency and unvoiced regions 304 where no fundamental frequency can be detected, e.g., as a result of pauses or aperiodic sounds generated by the speaker. To reduce variance of the speech artificially increased by the presence of unvoiced regions and, therefore, prevent artifacts associated with fitting to a distribution of discontinuous data, gap filling 204 may be applied to the data, e.g., p(t). Gap filling 204 may be performed using a variety of approaches. Gap filling 204 may first identify unvoiced regions (gaps) as regions where the pitch (or energy) data is unavailable or shows small values below a set threshold. In some embodiments, gap filling 204 may be performed in a local manner, e.g., by identifying, for each gapped region of times t (e.g., frame timestamps), a respective set of boundary values $p(t_1)$ and $p(t_2)$, where the boundary value $p(t_1)$ is the latest value of the previous voiced region (corresponding to time t 1 where the previous voiced region ends) and the boundary value $p(t_2)$ is the earliest value of the next voiced region (corresponding to time t 2 where the next voiced region begins). For example, gap filling 204 may then be performed using any suitable U-shaped function $U(\tau)$, e.g., for $p(t_1) > p(t_2)$, $$p(t_1 < t < t_2) = p(t_2) + [p(t_1) - p(t_2)] \times \left[ u\left(\frac{t-t_1}{t_2-t_1}\right) - \frac{t-t_1}{t_2-t_1} \right], \quad \text{Eq. (1)}$$

such that $U(0) = U(1) = 1$. For example, function $U(\tau)$ can be a quadratic parabola, a quartic parabola, or any other suitable function. In some embodiments, function $U(\tau)$ may have a fixed depth. In some embodiments, function $U(\tau)$ may have a depth that depends on boundary values $p(t_1)$ and/or $p(t_2)$. The form of the dependence of the gap-filling function $p(t_1 < t < t_2)$ is presented for illustration only and any other suitable gap-filling function $p(t_1 < t < t_2)$ may be used instead. In some embodiments, a non-polynomial function may be used, such as, e.g., $U(\tau) = 1 - U_0 \ln [1+\tau(1-\tau)]$, or some other logarithmic function, with coefficient $U_0$ (which determines the depth of the U-function) selected empirically based on maximizing performance of the model. FIG. 3B depicts one illustrative non-limiting example 310 of a local gap filling of unvoiced regions 306 using a U-shaped function, according to at least one embodiment.

Figure 3C:
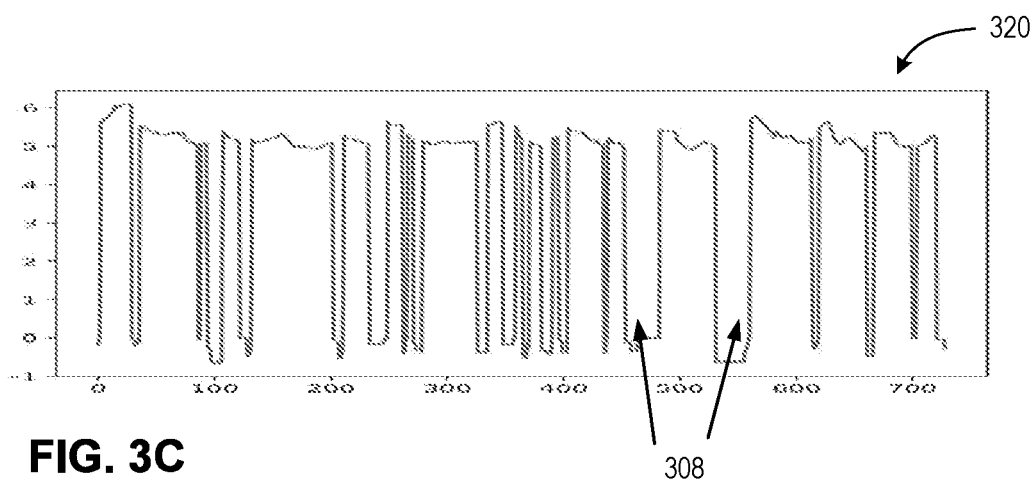
FIG. 3C depicts one illustrative non-limiting example of a local gap filling of unvoiced regions using a learned bias filter, according to at least one embodiment.

Local gap filling with a U-shaped function, as described above is agnostic about the underlying phoneme structure of the speech. In some embodiments, gap filling 204 of the unvoiced regions may be informed by the underlying phoneme structure, e.g., by correlating the locations of the gaps with an expected time cadence of the spoken phonemes output by phoneme timing model 220 (as indicated schematically with the dashed arrow in FIG. 2). In such embodiments, gap filling 204 may include a neural network. The neural network may use the output $\Phi_{text}$ of phoneme timing model 220, representing the timing sequence of phonemes identified in training text 202. In particular, phoneme timing model 220 may compute a regression function that predicts a negative per-phoneme bias for unvoiced regions and zero bias for voiced regions. The mask of identified (from $\Phi_{text}$) voiced phonemes may then applied to the data p(t) and the mask of unvoiced parts of the speech may similarly be used to apply a negative bias to unvoiced regions 302. The voiced/masks may be used as binary (True/False) conditional variable during latent variable sampling performed by latent space sampling engine 252. FIG. 3C depicts one illustrative non-limiting example 320 of a local gap filling of unvoiced regions 308 using a learned bias filter, according to at least one embodiment.

The gap-filled low-level data may then undergo dimensionality increase, which may include one or both of data grouping 206 and addition of auxiliary dimensions 208. The dimensionality increase may be performed in any way that preserves the bijectivity of the data. In some embodiments, data grouping 206 may include grouping data points $\{p_j\} = p_1, p_2 \ldots$ (with the subscript j being used as the shorthand for the time of the frame) into multi-dimensional units of two (three, etc.) data points, $(p_1, p_2), (p_3, p_4) \ldots$. Addition of auxiliary dimensions 208 may include adding first derivatives to the units of the data points, e.g., $(p_1, \partial p_1/\partial t, p_2, \partial p_2/\partial t), (p_3, \partial p_3/\partial t, p_4, \partial p_4/\partial t)$. The derivatives may be computed as the left derivative, e.g., $\partial p_1 < /\partial t = (p_1 - p_{j-1})/\Delta t$ (where $\Delta t$ is the frame spacing), as the right derivative, $\partial p_1 > /\partial t = (p_{1+1} - p_j)/\Delta t$, or as any weighted linear combination of the left and right derivatives. In some embodiments, the derivatives may be additionally scaled. For example, in an embodiments that uses a symmetric combination of the left derivative and the right derivative, the following value may be used, $$\frac{\partial p_j}{\partial t} = \alpha \frac{p_j - p_{j-1}}{2\Delta t} + \alpha \frac{p_{j+1} - p_j}{2\Delta t}, \quad \text{Eq. (2)}$$

with the scaling coefficient $\alpha$ may be selected to maximize the model stability. The inclusion of the derivatives improves contextual connections between different units of data, in addition to increasing the dimensionality of the inputs into normalizing flows model 230. In some embodiments, the units of pitch data can have different sizes than the units of energy data. For example, units of pitch data may include two (four, etc.) different frames while units of energy data may include four (eight, etc.) different frames.

Normalizing flows model 130 may be a neural network model that maps the statistics of the pitch frequency $\{p_j\}$ (and, similarly, energy) for different collected frames of data j. The normalizing flows technique is based on the conjecture that while the distribution of the data $\{p_j\}$ can be complicated and not resemble a normal distribution, the data may be related to some other latent variable z distributed according to the Gaussian distribution, e.g., with zero mean and unit variance (a non-zero mean and non-unit variance do not import any further meaning as an additional shift and rescaling of the variable z can always bring the mean and the variance to any desired value), $$p \sim N(0, I). \quad \text{Eq. (3)}$$

A transform that maps the data to the latent variable, $p_j \to z_j$ may be a one-to-one bijective transform parameterized by one or more parameters collectively denoted as $\theta$:

$$p = G_\theta(z). \quad \text{Eq. (4)}$$

The bijectivity ensures the existence of an inverse transformation, $z = G_\theta^{-1}(p)$. The distribution (probability density) $f_p(p)$ of vectors of the pitch data (e.g., vectors of data points $p = (p_j, \partial p_j/\partial t, p_{j+1}, \partial p_{j+1}/\partial t)$, or some other combinations of the pitch data) is proportional to the distribution of $f_z(z)$ of the corresponding latent vectors z with the coefficient of proportionality given by the Jacobian of the transform, $p \to z$:

$$f_p(p) = f_z(G_\theta^{-1}(p)) \times \left| \det \frac{\partial G_\theta^{-1}}{\partial p} \right|. \quad \text{Eq. (5)}$$

Normalizing flows model 130 may be trained to identify the transform $p = G_\theta(z)$, together with the values of the fitting parameter(s) $\theta$, that maximize the likelihood (e.g., log-likelihood) that the distribution $f_p(p)$ determined by Eq. (5) indeed matches the set of observed values $\{p_j\}$:

$$\theta = \operatorname{argmax}\left( \ln f_z(G_\theta^{-1}(p)) + \ln \left| \det \frac{\partial G_\theta^{-1}}{\partial p} \right| \right). \quad \text{Eq. (6)}$$

In some embodiments, the transform $G_\theta(z; \Phi_{text})$, identified by normalizing flows model 130, may be further informed by the text alignment matrix $\Phi_{text}$ that specifies cadence of phonemes in the training text 202 determined by phoneme timing model 220.

In some embodiments, the mapping $p = G_\theta(z)$ may be determined iteratively as a composite function $G_\theta(z) = g_N \circ g_{N-1} \circ \ldots \circ g_1(z)$ consisting of multiple functions $g_k(\theta, z)$, each function implemented as a separate subnetwork of normalizing flows model 130. In some embodiments, each iteration $g_k(\theta, z)$ may be performed using the technique of coupling layers, in which the dataset x, at each step, is split into two subsets, $x_A$ and $x_B$, with one subset kept unchanged during the iteration and the second subset undergoing a transformation that depends on the first subset as parameters, $$y_A = x_A, y_B = g_k(x_B, \theta_k(x_A)). \quad \text{Eq. (7)}$$

The inversion of the coupling layer is simplified by the need to invert only one subset of the transformation, $$x_A = y_A, x_B = g_k^{-1}(y_B, \theta_k(y_A)) \quad \text{Eq. (8)}$$

A coupling layer transformation may be a linear (affine) transformation, $$g_k = a(\theta_k(x_A)) x_B b(\theta_k(x_A)), \quad \text{Eq. (9)}$$

with a slope matrix a and a bias matrix b that can both depend parametrically on the data subset $x_A$. A subsequent iteration, $g_{k+1}$, may reverse the role of subsets A and B, and so on.

Linear coupling layers are characterized in that the slope a and bias b are the same for all values in the subset $x_B$ including both the voiced regions and unvoiced regions. It is the import of the present disclosure that allowing for non-linear (neural) splines facilitate a more nuanced approach to treatment of voiced/unvoiced dichotomy. Instead of being $x_B$-independent, the neural spline transformation may deploy a piecewise polynomial function. More specifically, a value $x_B$ may be multiplied and biased by matrices $a_{1m}$, $a_{2m}$, and $b_m$.

$$g_k = a_{2m}(\theta_k(x_A)) \cdot x_B^2 + a_{1m}(\theta_k(x_A)) \cdot x_B + b_m(\theta_k(x_A)), \quad \text{Eq. (10)}$$

that are defined for mth domain (bin) of values $x_B$.

In some embodiments, the polynomial functions may be monotonic within each bin, to ensure invertibility. In some embodiments, the polynomial functions may be quadratic functions, although higher-order polynomial functions may also be used, e.g., to more accurately represent the data near the boundaries of the voiced and unvoiced regions. The inclusion of non-linear neural splines allows normalizing flows model 130 to learn transformations that are advantageous for representing multi-modal (e.g., voiced/unvoiced) inputs. Possible architecture of normalizing flows model 130 is described below, in conjunction with FIG. 5.

After completion of the training of normalized flows model 230, the determined latent variable transform 234 may be provided to a synthesis server 250 that synthesizes a new speech for a new text 251 (previously unseen by training server 212). In addition to latent variable transform 234, synthesis server 250 may further receive the trained phoneme timing model 120. When synthesis server 250 obtains a new text 251 for speech synthesis, phoneme timing model 220 may identify timing cadence (prosody) for various phonemes of the synthetic speech determined from text 251. A latent space sampling engine 252 may perform random sampling from the learned distribution of pitch and energy, which has been mapped to the target Gaussian distributions of the latent variables by training server 212. Latent space sampling engine 252 may perform the sampling in conjunction with the timing sequence of phonemes $\Phi_{text}$ generated for text 251 by phoneme timing model 220. The sampled distributions may be used by a spectrogram model (mel-decoder) 254 to generate spectrograms for text 251. A vocoder model 260 may then transform the generated spectrograms to synthetic audio data 270, which may include actual audio waveforms of the generated speech corresponding to text 251. Spectrogram model 254 and vocoder model 260 may be any suitable models trained to generate speech based on sampled speech attributes and timing cadence of the speech.

Figure 4:
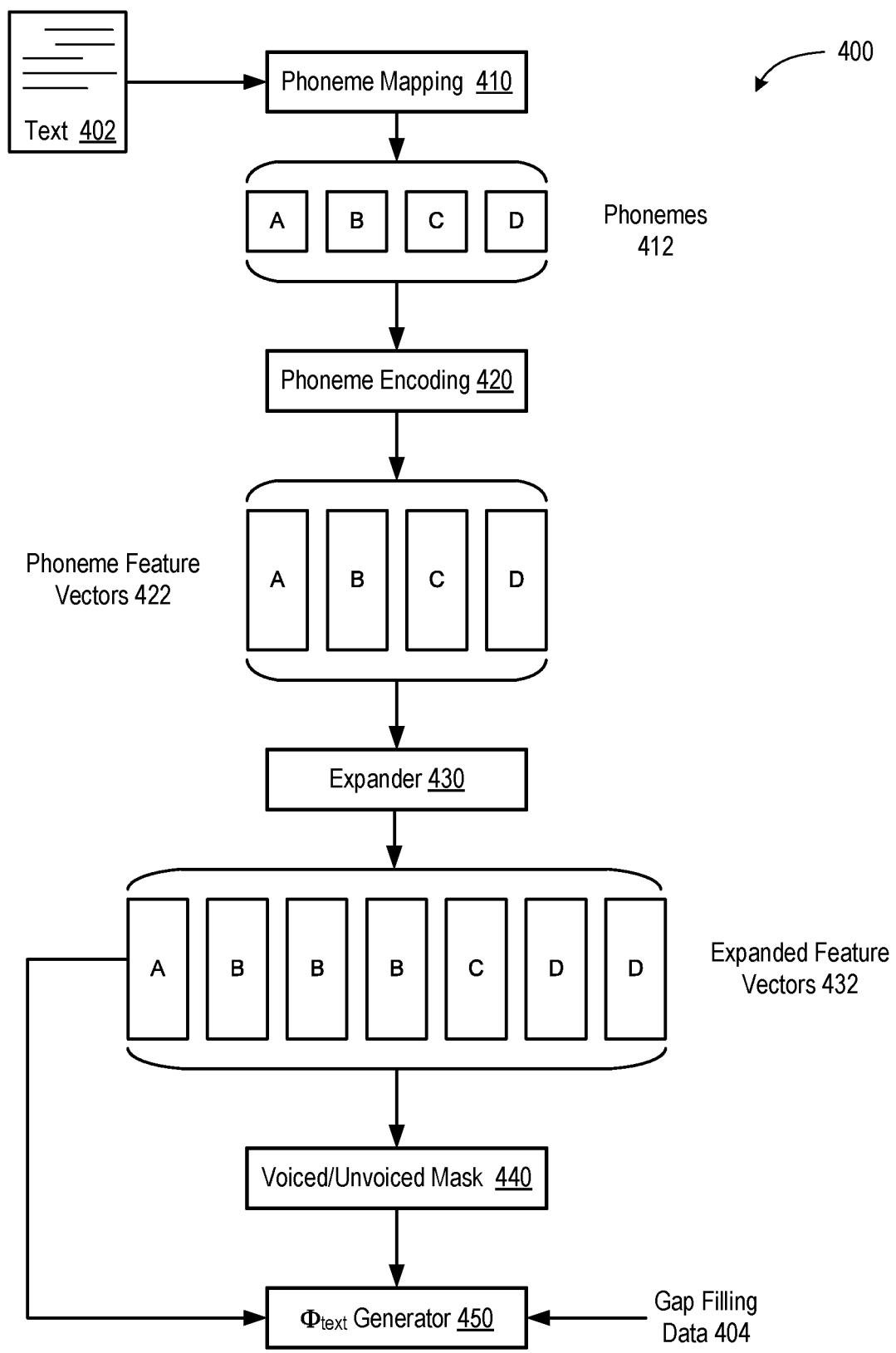
FIG. 4 illustrates example operations of phoneme timing model, according to at least one embodiment.

FIG. 4 illustrates example operations 400 of phoneme timing model 220, according to at least one embodiment. An input into phoneme timing model 220 may include text 402. Text 402 may be processed by one or more layers of neurons of a phoneme mapping network 410 to partition text 402 into phonemes 412, which may be selected from a list of known phonemes for a language used in text 402. Phonemes 412 may be processed by a phoneme encoder 420 that associates a phoneme feature vector 422 with each identified phoneme 412. Phoneme feature vectors 422 may be time-multiplied by an expander network 430 according to a duration of each phoneme in the spoken text 402. The expanded (multiplexed) feature vectors 432 may be processed by voiced/ unvoiced mask network 440. Voiced/unvoiced mask network 440 may be a binary classifier that classifies various frames (e.g., spaced by time increments $\Delta_t$) as voiced frames or unvoiced frames. For example, the binary classifier may use a regression function that predicts a probability w t that frame t is a voiced frame. The binary classifier may then classify frame t as voiced frame (indicator $V_t=1$) if probability w t is above a threshold probability, $w_t > w_0$ (which may be $w_0 = 0.5$ or some other value) and as unvoiced frame (indicator $V_t=0$) otherwise. The mask output by voiced/unvoiced mask network 440 may be merged with the expanded feature vectors 432 by $\Phi_{text}$ generator 450 to obtain the text alignment matrix $\Phi_{text}$ that characterizes temporal cadence of phonemes in the text 402.

The $\Phi_{text}$ generator 450 may be informed by gap filling data 404. More specifically, the output $\Phi_0$ may be rescaled and biased, e.g., $$\Phi_{text} = \alpha_t \Phi_0 + \beta_t, \qquad \text{Eq. (10)}$$

where the rescaling coefficient $$\alpha_t = G(V_t s_{voiced} + (1 - V_t) s_{unvoiced}), \qquad \text{Eq. (11)}$$

may be obtained using the voiced/unvoiced indicator $V_t$ (output by voiced/unvoiced mask network 440) and learned (by normalizing flows model 230 of FIG. 2) scale vectors for voiced, $s_{voi}$, and unvoiced, $s_{unvoiced}$, regions. Similarly, the bias coefficients $$\beta_t = c \tan h(V_t b_{voiced} + (1 - V_t) b_{unvoiced}) \qquad \text{Eq. (12)}$$

may be obtained using learned bias vectors for voiced, $b_{voiced}$, and unvoiced, $b_{unvoiced}$, regions. The factors σ and c may be fixed coefficients determined empirically based on the model's performance during testing.

FIG. 5A illustrates an example architecture of a bipartite normalizing flow model 500 that implements non-linear neural splines, according to at least one embodiment. As illustrated in FIG. 5A, pitch (and, similarly, energy) data 502 may be processed by a first plurality of linear coupling subnetworks 504, each subnetwork implementing an iteration g k of the composite transformation $G_\theta(z) = g_N \circ g_{N-1} \circ \ldots \circ g_1(z)$. Each linear coupling subnetwork 504 may split the input data into two subsets, e.g., $x_A$ and $x_B$, keep one of the subsets unchanged (e.g., $x_A$) and perform a 1×1 invertible convolutions 506 followed by operations of a linear coupling layer 508 on the second subset (e.g., $x_B$). Although FIG. 5A illustrates two linear coupling subnetworks 504, any other number of such subnetworks may be deployed. The data processed by linear coupling subnetworks 504 may be further processed by a second plurality of non-linear (spline) coupling subnetworks 510, each non-linear coupling subnetwork 510 including a 1×1 invertible convolutions 516 followed by operations of a non-linear coupling layer 518. Although FIG. 5A illustrates four non-linear coupling subnetworks 510, any other number of such subnetworks may be deployed. The output of the bipartite normalizing flow model represents the mapping 520 from the pitch data (and, similarly, energy data) to a respective latent variable, $p = G_\theta(z)$. Numerous variations of the architecture 500 may be implemented. In some embodiments, some or all of invertible convolutions 506 and/or invertible convolutions 516 may be absent. In some embodiments, linear coupling subnetworks 504 may be replaced with additional non-linear coupling subnetworks 510.

FIG. 5B illustrates an example architecture of an autoregressive normalizing flow model 530 with non-linear neural splines, according to at least one embodiment. FIG. 5B illustrates an example double-pass (forward-backward) autoregressive model 530, but in some embodiments a single-pass (e.g., forward pass) model may be used. As illustrated in FIG. 5B, model 530 may process pitch (and, similarly, energy) units of data 532 $x_1, x_2 \ldots x_N$. Each unit $x_j$ of data 532 may be a single value or a vector of data, e.g., $x_j = (p_j, \partial p_j / \partial t, p_{j+1}, \partial p_{j+1} / \partial t)$. Each pass through the autoregressive model 530 may implement one iteration $g_j$ of the composite transformation $G_\theta(z) = g_N \circ g_{N-1} \circ \ldots \circ g_1(z)$. Each iteration may include (not shown in FIG. 5B for brevity and conciseness) splitting the input data into two subsets, applying invertible convolutions to the split data, and performing various other operations described above. The autoregressive nature of model 530 means that each subsequent unit of data 532 may depend on processing of all or at least some of the units processed earlier.

More specifically, during the forward pass through autoregressive model 530, unit $x_1$ may be processed first, followed by unit $x_2$, and so on, up to the last unit $x_N$. Each unit of data 532 may be processed by a subnetwork with memory, e.g., a long short-term model (LSTM) 534, or any other suitable memory network. LSTM 534 may generate a hidden variable 536 that takes into account a context of units of data processed earlier. More specifically, hidden variable 536 for processing unit $x_j$ of data, $H_j = H(0, x_1 \ldots x_{j-1})$, may depend on units $x_1 \ldots x_{j-1}$. During processing of the first unit $x_1$, the memory state of LSTM may be set to zero, as indicated schematically with zero input into ISTM 534 in FIG. 5B. A spline subnetwork 538 may perform evaluation of the current unit $x_j$ together with the hidden variable $H_j$ to determine a unit $z_j$ of an output data 540. The spline subnetwork 538 may implement non-linear neural splines. In those embodiments that deploy the bipartite structure of FIG. 5A, spline subnetwork 538 may refer to linear splines or non-linear splines depending on the specific part of the bipartite model that processes data 532.

The units of output data 540 define jointly the respective iteration $g_k(.)$ of the mapping function $G_\theta(.)$. Following the completion of the forward pass through the autoregressive model, the units of output data 540 may be processed, e.g., as part of determining the next iteration $g_{k+1}(.)$, in the reverse order. In particular, unit $z_N$ may be processed first, followed by unit $z_{N-1}$, and so on, up to the first unit $z_1$. During the backward pass, LSTM 534 generates a hidden variable 536 that takes into account a context of units of data processed before, e.g., $H_j = H(0, z_N \ldots z_{j+1})$. The described process may then continue, e.g., with odd iterations $g_k(.)$ of the mapping function determined during forward passes through autoregressive model 530 and even iterations of the mapping function determined during backward passes through autoregressive model 530. Numerous variations of autoregressive model 530 are within the scope of the present disclosure. In some embodiments, e.g., as illustrated in FIG. 5B, the forward and backward passes may utilize the same LSTM 534 and/or the same spline subnetwork 538. In some embodiments, the forward and backward passes may utilize different LSTM 534 and/or subnetwork 538, which may be trained separately. This may advantageously account for the differences in how human speech sounds in the forward and reverse directions.

FIG. 6 is a flow diagram of method 600 of training generative text-to-speech models with normalizing flows and non-linear splines for high-quality synthesis, according to some embodiments of the present disclosure. Method 600 may be performed by one or more processing units (e.g., CPUs and/or GPUs), which may include (or communicate with) one or more memory devices. In at least one embodiment, method 600 may be performed by processing units of computing device 110 and/or synthesis server 150. In at least one embodiment, processing units performing method 600 may be executing instructions stored on a non-transient computer-readable storage media. In at least one embodiment, method 600 may be performed by multiple processing threads (e.g., CPU threads and/or GPU threads), each thread executing one or more individual functions, routines, subroutines, or operations of the method. In at least one embodiment, processing threads implementing method 600 may be synchronized (e.g., using semaphores, critical sections, and/or other thread synchronization mechanisms). Alternatively, processing threads implementing method 600 may be executed asynchronously with respect to each other. Various operations of method 600 may be performed in a different order compared with the order shown in FIG. 6. Some operations of method 600 may be performed concurrently with other operations. In at least one embodiment, one or more operations shown in FIG. 6 may not always be performed.

Method 600 may be performed in the context of text-to-speech translations. Method 600 may involve using speech samples of a specific person, identifying representative features in these speech samples (including statistics of pitch and volume), and using the identified features to produce new speech that sounds as coming from that person. In some embodiments, speech synthesized using method 600 may include sounds of non-human origins, e.g., sounds of animals. In some embodiments, speech synthesized using method 600 may also include sounds produced by non-living entities, including natural forces, such as wind, sea, ocean, thunderstorms, and various other atmospheric or naval phenomena. In some embodiments, speech synthesized using method 600 may further include artificial sounds, such as sounds of vehicles, industrial equipment, and so on.

Samples of the speech may be represented via time series of various speech characteristics (SC), e.g. p(t), E(t), etc. SC can be any digitized representations of speech, including but not limited to a representation of a frequency of a speech (e.g., pitch or fundamental frequency), a representation of an amplitude (e.g., volume or energy) of the speech, and so on. At block 610, processing units executing method 600 may perform a preprocessing of the time series of the SC. As depicted with the top callout portion of FIG. 6, the preprocessing may include a number of operations. More specifically, at block 612, the preprocessing may include identifying and filling a plurality of gaps in the time series of the SC with synthetic values. In some embodiments, the synthetic values for each gap of the plurality of gaps may be determined based on a local neighborhood of the SC adjacent to the respective gap of the plurality of gaps (e.g., as described in conjunction with FIG. 3B). In some embodiments, the synthetic values for each gap of the plurality of gaps may be determined using a context neural network that correlates a respective gap of the plurality of gaps with a spoken phoneme sequence (e.g., as described in conjunction with FIG. 3C). In some embodiments, the preprocessing of the time series of the SC may include increasing the dimensionality of the SC. More specifically, at block 614, the preprocessing of the time series of the SC may involve grouping the time series of the SC into data units comprising values of the SC associated with two or more different times (e.g., grouping values $x_1$, $x_2$, $x_3$, $x_4$ . . . into units ($x_1$, $x_2$), ($x_3$, $x_4$) . . . ). At block 616, the preprocessing of the time series of the SC may involve including one or more discrete time derivatives of the SC into the data units (e.g., ($x_1$, $x_2$)→($x_1$, $\partial x_1/\partial t$, $x_2$, $\partial x_2/\partial t$)).

At block 620, method 600 may continue with the processing units identifying, using one or more iterations, a mapping of a time series of a SC (e.g., time series of pitch data units) on a target distribution of a latent variable (e.g., x=G(z)). In some embodiments, the target distribution may be a Gaussian distribution, a uniform distribution, or any other suitable distribution. The one or more iterations may express the mapping G(.) as a composite function, G(.)= $g_N \circ g_{N-1} \circ \ldots \circ g_1(.)$. In some embodiments, each of the one or more iterations may include a non-linear invertible transformation of at least a subset of the time series of the SC. In some embodiments, the subset of the time series of the SC may include a first half of the time series of the SC. (The terms "first half" and "second half" should be understood as mere identifiers that do not presuppose any temporal or logical order.) In some embodiments, each of the one or more iterations may keep unchanged a second half of the time series of the SC. The first half and the second half may change roles in consecutive iterations, with the half that was unchanged during the jth iteration to undergo a non-linear transformation during the j+1th iteration.

In some embodiments, the non-linear invertible transformation may include a plurality of (domain-specific) non-linear transformations, each of the plurality of non-linear transformations used for a respective domain of a plurality of domains of the SC. In some embodiments, each of the plurality of non-linear transformations may be or include a second-order polynomial transformation. In some embodiments, parameters of the non-linear invertible transformation(s) may be determined using a neural network that approximates a statistics of the time series of the SC a statistics predicted for the SC based on the identified mapping and the target distribution of the latent variable. In some embodiments, the neural network may be trained to approximate the statistics of the times series of the SC in view of a spoken phoneme sequence (e.g., as expressed via the timing sequence of phonemes $\Phi_{text}$ described in conjunction with FIG. 4.)

At block 630, processing units performing method 600 may include identifying an additional mapping of a time series of an additional SC (e.g., energy of speech) on an additional target distribution of an additional latent variable. In some embodiments, identifying the additional mapping may include performing any or all operations described in conjunction with block 620, for example identifying an additional non-linear invertible transformation of at least a subset of the time series of the additional SC.

Blocks 640-650 may be performed as part of synthesis of new speech based on the mapping(s) identified at blocks 610-630. In some embodiments, blocks 640-650 may be performed by the same computing device that performs blocks 610-630. In some embodiments, blocks 640-650 may be performed by a different computing device than the computing device that performs blocks 610-630.

At block 640, method 600 may continue with receiving a text and, at block 650, the processing device performing method 600 may include generating, using the identified mapping(s), a speech corresponding to the text. As indicated with the bottom callout portion of FIG. 6, generating the speech may include, at block 652, probabilistically sampling the SC using the target distribution of the latent variable and the identified mapping(s).

Inference and Training Logic

Figure 7A:
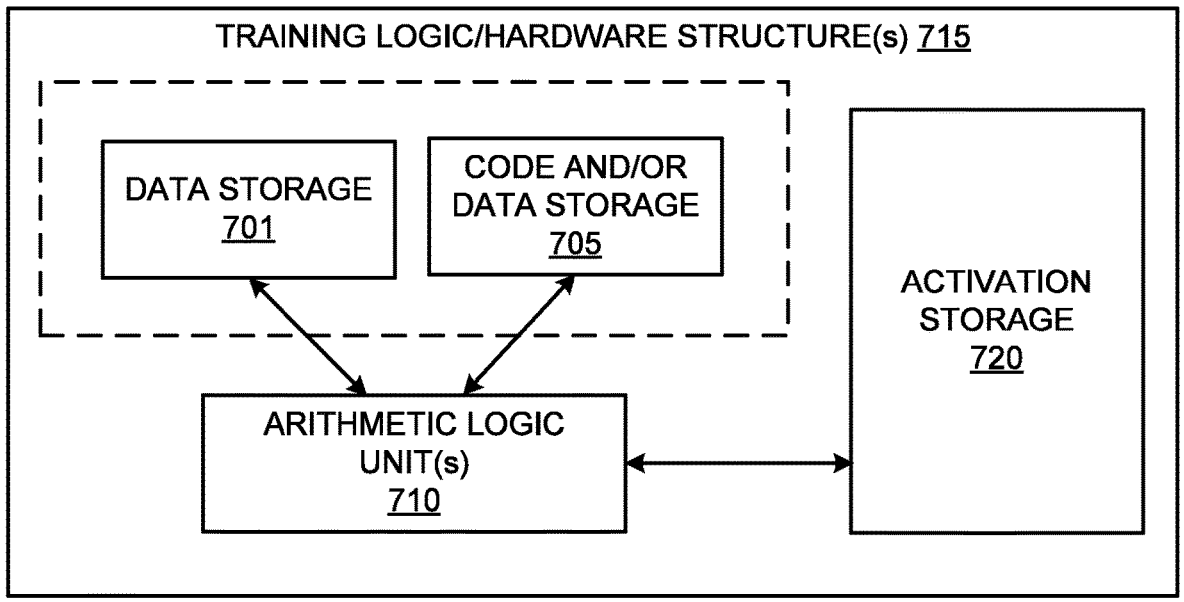
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
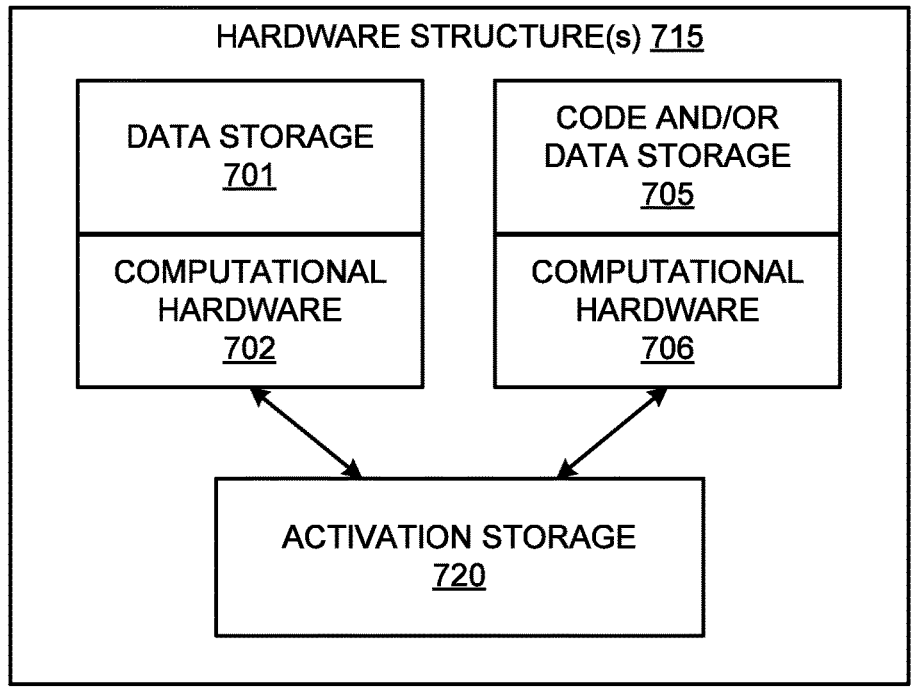
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
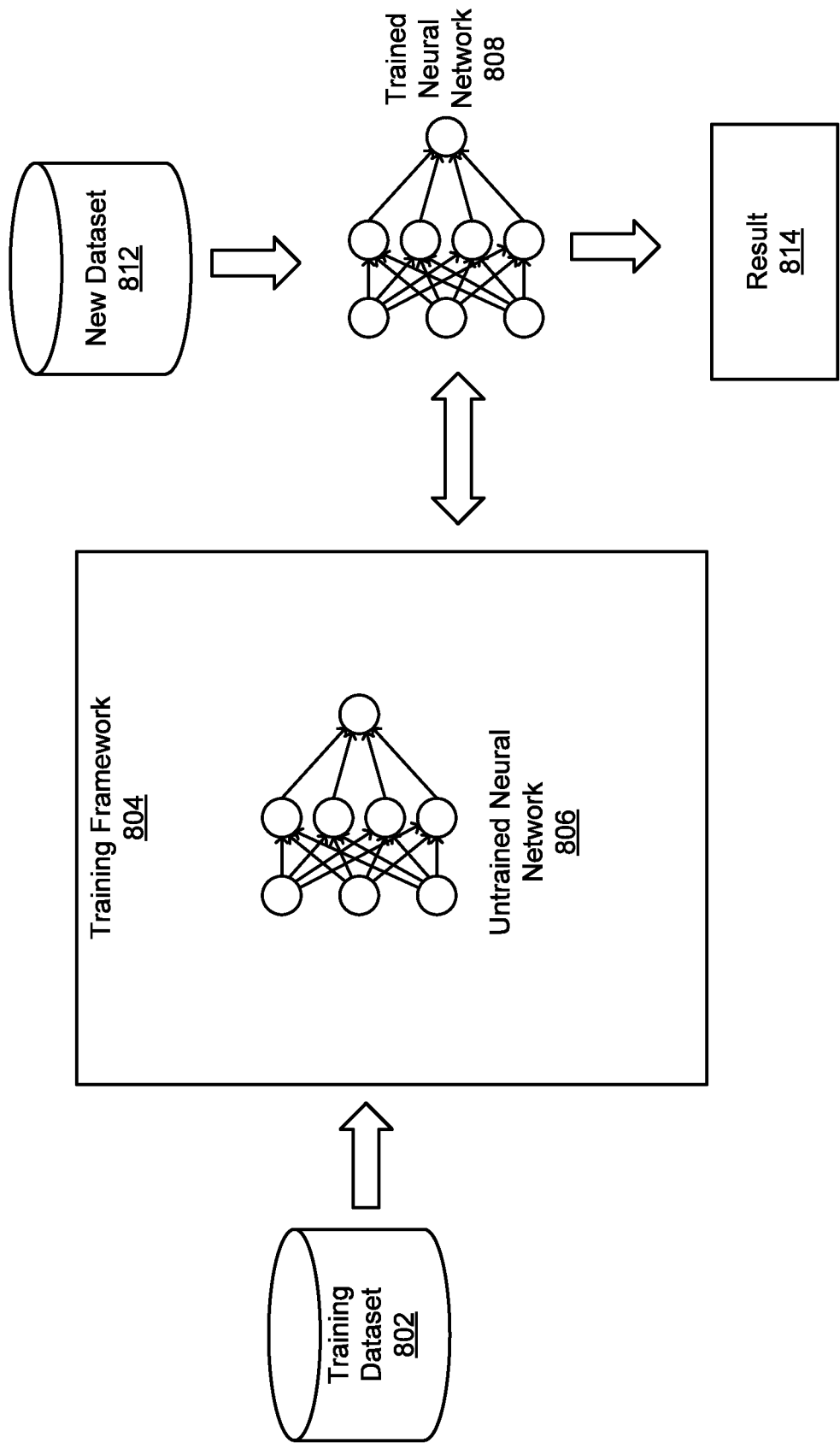
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
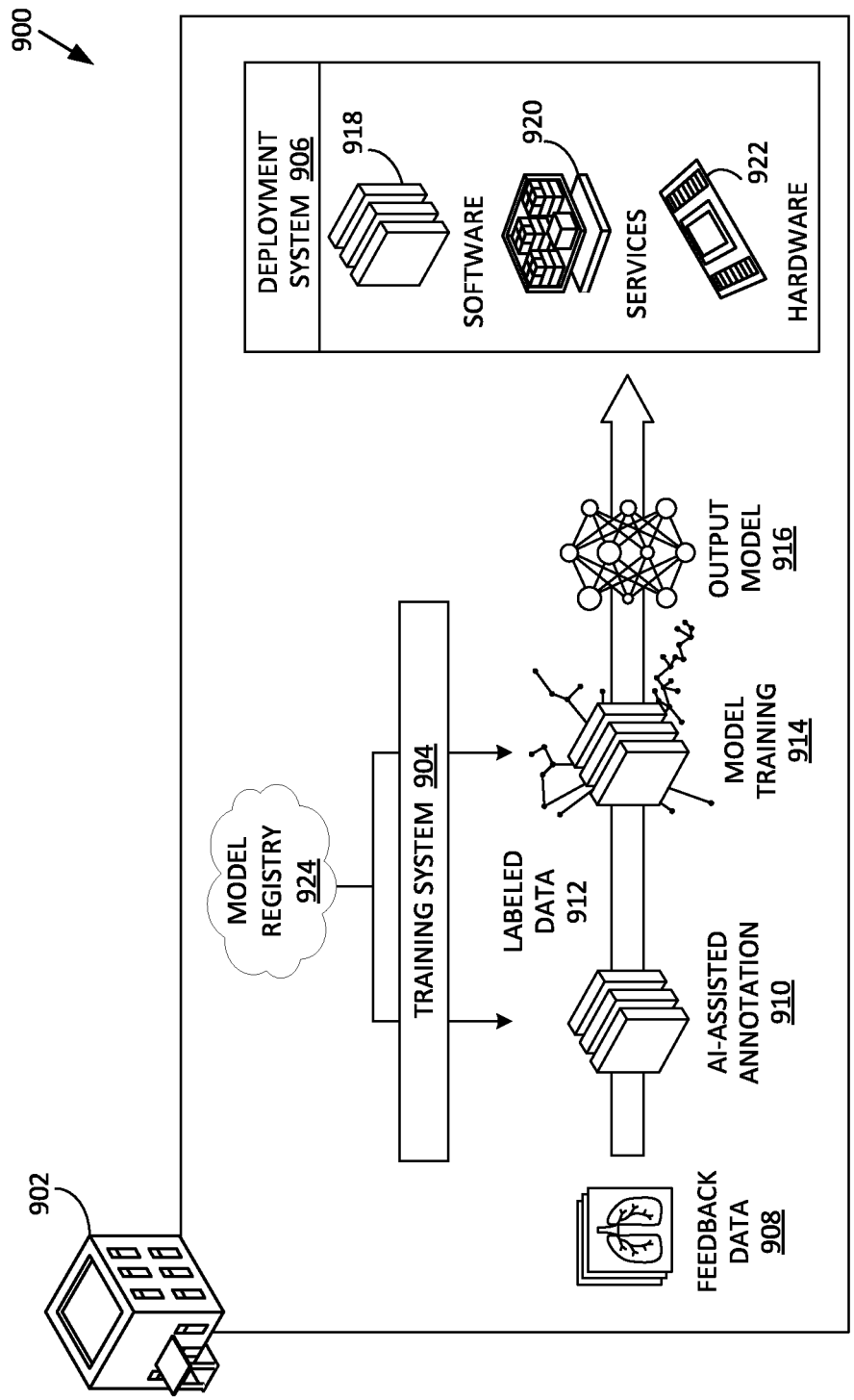
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo preprocessing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
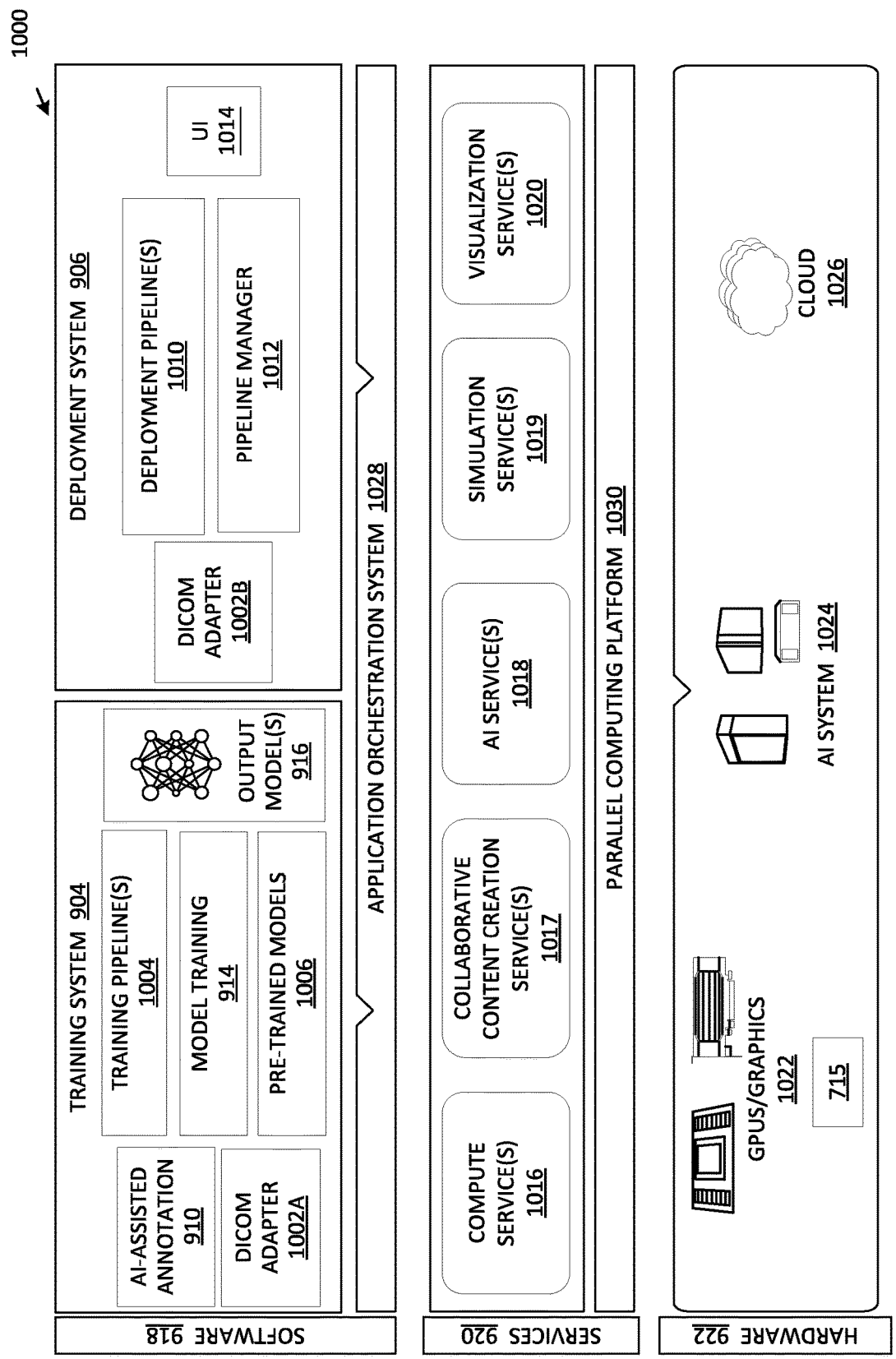
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX' system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC') may be executed using an AI/deep learning supercomputer(s) and/or GPU-optimized software (e.g., as provided on NVIDIA's DGX' systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turn-around time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA ° and/or QUADRO ° GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX') may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC') that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method to obtain a speech model, the method comprising:
   filling, with synthetic values, one or more gaps in a time series of a speech characteristics (SC);
   identifying, using one or more iterations, a mapping of the time series of the SC on a target distribution of a latent variable,
      wherein each of the one or more iterations comprises a non-linear invertible transformation of at least a subset of the time series of the SC, and
      wherein parameters of the non-linear invertible transformations are determined using a neural network that approximates a statistics of the time series of the SC with a statistics predicted for the SC based on the identified mapping and the target distribution of the latent variable; and
   generating, using the identified mapping, a speech signal corresponding to an input text.

2. The method of claim 1, wherein the non-linear invertible transformation comprises a plurality of non-linear transformations, each of the plurality of non-linear transformations used for a respective domain of a plurality of domains of the SC.

3. The method of claim 2, wherein each of the plurality of non-linear transformations comprises a second-order polynomial transformation.

4. The method of claim 1, wherein the target distribution is a Gaussian distribution.

5. The method of claim 1, wherein the subset of the time series of the SC comprises a first half of the time series of the SC, and wherein each of the one or more iterations keeps unchanged a second half of the time series of the SC.

6. The method of claim 1, further comprising:
   identifying an additional mapping of a time series of an additional SC on an additional target distribution of an additional latent variable, wherein identifying the additional mapping comprises identifying an additional non-linear invertible transformation of at least a subset of the time series of the additional SC.

7. The method of claim 6, wherein the SC comprises a representation of a frequency of a speech, and wherein the additional SC comprises a representation of an amplitude of the speech.

8. The method of claim 1, wherein the synthetic values for each gap of the one or more gaps are determined based on a local neighborhood of the SC adjacent to a respective gap of the one or more gaps.

9. The method of claim 1, wherein the synthetic values for each gap of the one or more gaps are determined using a context neural network that correlates a respective gap of the one or more gaps with a spoken phoneme sequence.

10. The method of claim 9, wherein an output of the context neural network is modified using a mask that identifies individual frames of the time series as one of a voiced frame or an unvoiced frame.

11. The method of claim 1, further comprising:
grouping the time series of the SC into data units comprising values of the SC associated with two or more different times.

12. The method of claim 11, wherein each of the data units further comprises one or more discrete time derivatives of the SC.

13. The method of claim 1, wherein the neural network is trained to approximate the statistics of the times series of the SC in view of a spoken phoneme sequence.

14. The method of claim 1, wherein generating the speech signal comprises:
probabilistically sampling the SC using the target distribution of the latent variable and the identified mapping.

15. A system comprising:
a memory device; and
one or more processing devices, communicatively coupled to the memory device, to:
  fill, with synthetic values, one or more gaps in a time series of a speech characteristics (SC);
  identify, using one or more iterations, a mapping of a time series of a speech characteristics (SC) on a target distribution of a latent variable,
    wherein each of the one or more iterations comprises a non-linear invertible transformation of at least a subset of the time series of the SC, and
    wherein parameters of the non-linear invertible transformation are determined using a neural network that approximates a statistics of the time series of the SC with a statistics predicted for the SC based on the identified mapping and the target distribution of the latent variable; and
  generate, using the identified mapping, a speech signal corresponding to an input text.

16. The system of claim 15, wherein the non-linear invertible transformation comprises a plurality of non-linear transformations, each of the plurality of non-linear transformations used for a respective domain of a plurality of domains of the SC.

17. The system of claim 15, wherein the one or more processing devices are further to:
group the time series of the SC into data units comprising values of the SC associated with two or more different times.

18. The system of claim 17, wherein each of the data units further comprises one or more discrete time derivatives of the SC.

19. A non-transitory computer-readable medium storing instructions thereon, wherein the instructions, when executed by a processing device, cause the processing device to:
fill, with synthetic values, one or more gaps in a time series of a speech characteristics (SC);
identify, using one or more iterations, a mapping of a time series of a speech characteristics (SC) on a target distribution of a latent variable,
  wherein each of the one or more iterations comprises a non-linear invertible transformation of at least a subset of the time series of the SC, and
  wherein parameters of the non-linear invertible transformation are determined using a neural network that approximates a statistics of the time series of the SC with a statistics predicted for the SC based on the identified mapping and the target distribution of the latent variable; and
generate, using the identified mapping, a speech signal corresponding to an input text.

* * * * *